(12) United States Patent
Yap

(10) Patent No.: US 8,844,377 B2
(45) Date of Patent: Sep. 30, 2014

(54) SYSTEM FOR A PEDALING TORQUE MEASUREMENT DEVICE

(71) Applicant: Fook Fah Yap, Singapore (SG)

(72) Inventor: Fook Fah Yap, Singapore (SG)

(*) Notice: Subject to any disclaimer, the term of this patent is extended or adjusted under 35 U.S.C. 154(b) by 6 days.

(21) Appl. No.: 13/886,712

(22) Filed: May 3, 2013

(65) Prior Publication Data

US 2013/0291656 A1 Nov. 7, 2013

Related U.S. Application Data

(60) Provisional application No. 61/643,229, filed on May 5, 2012.

(51) Int. Cl.
*G01L 3/10* (2006.01)
*G01L 3/14* (2006.01)

(52) U.S. Cl.
CPC ............... *G01L 3/10* (2013.01); *G01L 3/1457* (2013.01)
USPC ................................ 73/862.191; 73/862.046

(58) Field of Classification Search
CPC ............ B62M 6/50; G01L 3/108; G01L 3/10; G01L 3/02
USPC ........................ 73/862.041–862.046, 862.191
See application file for complete search history.

(56) References Cited

U.S. PATENT DOCUMENTS

| | | | | |
|---|---|---|---|---|
| 5,027,303 A * | 6/1991 | Witte | | 702/44 |
| 5,571,056 A * | 11/1996 | Gilbert | | 474/80 |
| 6,269,702 B1 * | 8/2001 | Lambson | | 73/862.045 |
| 7,806,006 B2 * | 10/2010 | Phillips et al. | | 73/862.338 |
| 7,861,599 B2 * | 1/2011 | Meggiolan | | 73/794 |
| 7,975,561 B1 * | 7/2011 | Ambrosina et al. | | 73/862.338 |
| 2014/0138174 A1 * | 5/2014 | Getta et al. | | 180/220 |

* cited by examiner

*Primary Examiner* — Max Noori

(57) ABSTRACT

A system for measuring torque while cycling can be retrofitted to an existing crankset. A sensor member is placed in between a chainring and crank arm, interconnecting the two. At least one strain gage is placed on the sensor, and is connected with known resistors to form a bridge circuit, specifically a Wheatstone bridge. An electronic package including a battery, strain signal amplifier, an analog-to-digital signal converter, a microprocessor, and a wireless transmitter allows the strain of the strain gages to be measured and converted to a torque value. The torque value can then be wirelessly transmitted to a receiver on a display, itself mounted to the bicycle. Different types and arrangements of strain gages can be used to measure tension, compression, and shearing of the sensor member, providing inputs and a more accurate torque reading. The sensor member can be a unitary body or split into individual sensor members.

18 Claims, 22 Drawing Sheets

SYSTEM FOR A PEDALING TORQUE MEASUREMENT DEVICE

The current application claims a priority to the U.S. Provisional Patent application Ser. No. 61/643,229 filed on May 5, 2012.

FIELD OF THE INVENTION

The present invention relates generally to a sensor apparatus which can be retrofitted to a crankset, allowing a cyclist to monitor their torque and power while pedaling.

BACKGROUND OF THE INVENTION

Enthusiastic cyclists have always been looking for ways to improve their performance. That being said one of the commonly used methods of improvement is through measuring the output power performance of the cyclist. To estimate and increase their performance, professional cyclists can use power measurement from their pedaling to increase their overall ability to train. The power generated during the cyclist's ride has become the means for triathletes and professionals to have direct measurement system that can develop better training remedies. Furthermore, these measuring systems can have implications in power boosting mechanism where signals received from the bicyclist pedaling and road conditions can essentially engage power assisting instrument. The assisting mechanism automatically engages gears and/or an electric drive so that the cyclist can place less energy on the pedals but still travel faster or even further.

In the existing market, there is a variety of products that have addressed what cyclists call for but one thing is clear that there is still area for improvement. Some areas of concern include cost, reliability, and efficiency in which not all products can suffice. The cyclists have to choose between costly after-market replacements or hard to install sets of complicated additions to their bicycle. Preinstalled options would cost even more since a bicycle with built in gages is required for purchase.

This invention presents an ideal retrofitted addition with consideration of cost, reliability, and efficiency for a better cycling experience and improved training. This device is be simple, easy to install, and can have various implications, some of which may have not been included.

DETAILED DESCRIPTION OF THE INVENTION

All illustrations of the drawings are for the purpose of describing selected versions of the present invention and are not intended to limit the scope of the present invention.

Figure 1:
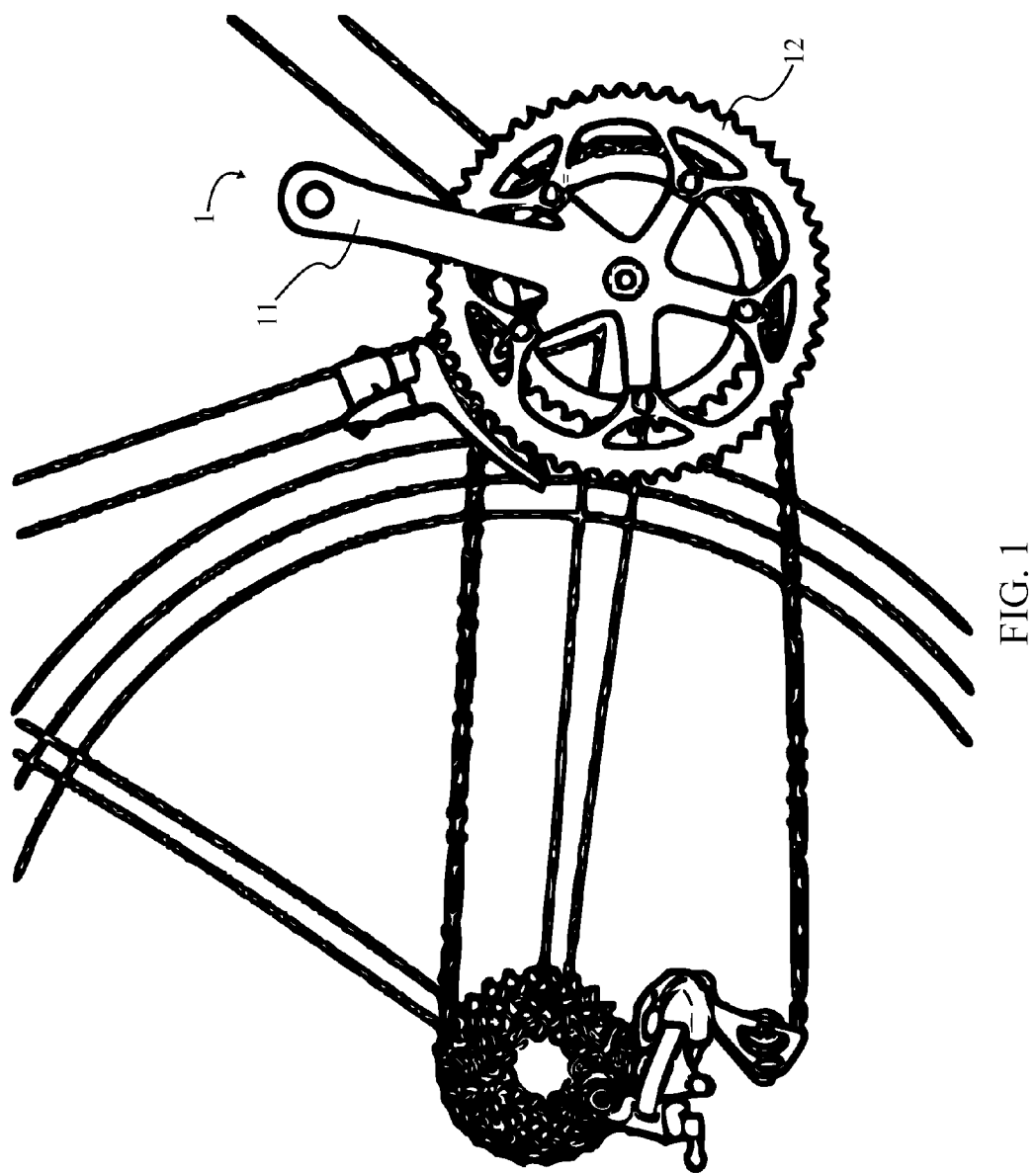
FIG. 1 is a graphic showing a section of a typical bicycle, including the crankset.
Figure 2:
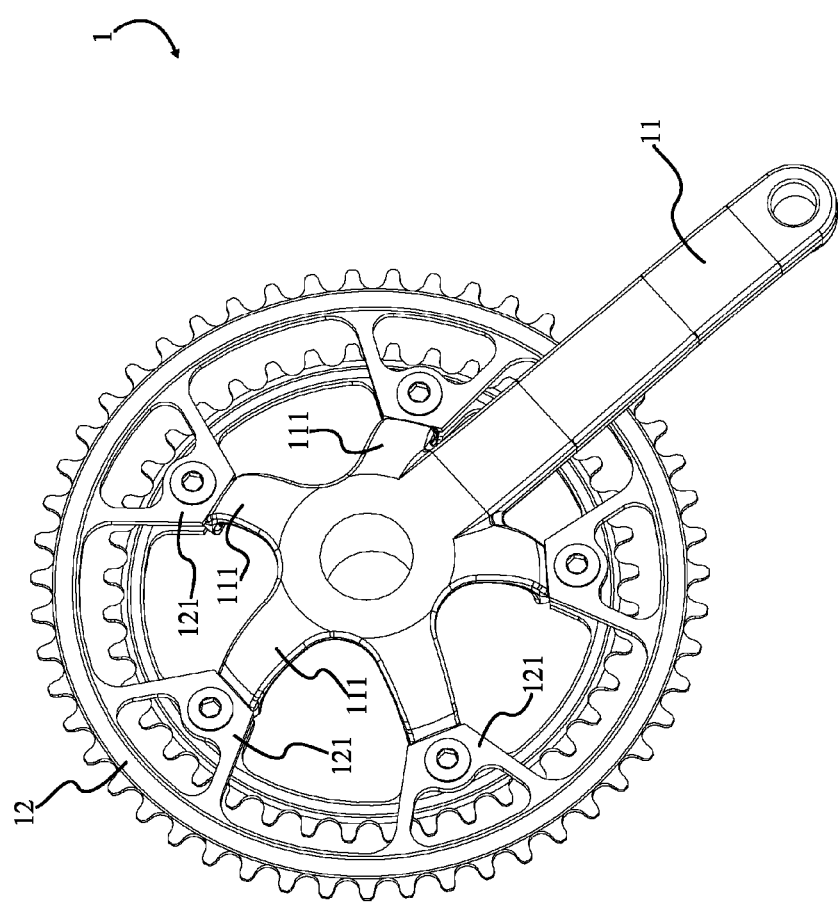
FIG. 2 is a graphic showing the crankset of a typical bicycle.

The present invention is a kit that can be retrofitted to a typical bicycle (FIG. 1 and FIG. 2) to allow a user to measure pedaling torque while riding a bicycle. The system of the present invention comprises a crankset 1, a plurality of sensor members 2, a bridge circuit 3, and an electronic package 4. The plurality of sensor members 2 are installed on the crankset 1. The plurality of sensor members 2 measure strain during pedaling, which is used to calculate torque by means of the bridge circuit 3 and the electronic package 4.

The crankset 1, visible in FIG. 3, FIG. 4, FIG. 7, and FIG. 13, comprises a crank arm 11 and a chainring 12, which are interconnected by the plurality of sensor members 2. The crank arm 11 comprises a plurality of spider arms 111, while the chainring 12 comprises a plurality of brackets 121. Each of the plurality of spider arms 111 comprises an arm mounting hole 112 and each of the plurality of brackets 121 comprises a chain ring mounting hole 122. The plurality of spider arms 111 are radially positioned around a rotation axis 17 of the chainring 12. In a typical bicycle, the crank arm 11 and the chainring 12 are attached to each other by means of spider arms 111 and the plurality of brackets 121; each arm mounting hole 112 is aligned with a single chainring mounting hole 122. The spider arm 111 and chainring 12 are secured to each other by fasteners that traverse through an arm mounting hole 112 and respective chainring mounting hole 122. Though the present invention describes a single chainring 12, some bicycles incorporate multiple chainrings 12. The present invention is capable of being retrofitted to a bicycle with multiple chainrings 12, as long as the plurality of sensor members 2 can be engaged to at least one of the chainrings 12.

The plurality of sensor members 2, similar to the plurality of spider arms 111, are radially positioned around the rotation axis 17 of the chain ring. Each of the plurality of sensor members 2 comprises an arc-shaped body 21, a first finger 22, a second finger 23, and at least one strain gage 24, as shown in FIG. 5, FIG. 6, FIG. 8, and FIG. 11. The arc-shaped body 21 has a circular-arc profile, with the first finger 22 and the second finger 23 being positioned at opposite ends along the arc of the arc-shaped body 21. The first finger 22 and the second finger 23 are radially connected to the arc-shaped body 21, protruding outwards from the arc-shaped body 21. The profile of the full sensor member 2, including the arc-shaped body 21, first finger 22, and second finger 23, has a symmetry similar to that of a V-shape. Positioned on the arc-shaped body 21, in the center between the first finger 22 and the second finger 23, is the at least one strain gage 24. The strain gage 24 measures strain across the sensor member 2 during pedaling, which is used in combination with the bridge circuit 3 and electronic package 4 to calculate torque. Depending on the orientation of the strain gage 24 in relation to the sensor member 2 and the orientation of the sensor member 2 in relation to the crankset 1, the strain gage 24 can measure tension, compression, or shear.

To allow the sensor member 2 to interconnect the crank arm 11 and the chainring 12, the first finger 22 comprises a first finger mounting hole 221 and the second finger 23 comprises a second finger mounting hole 231, as depicted in FIG. 5, FIG. 6, FIG. 8, and FIG. 11. The first finger mounting hole 221 and the second finger mounting hole 231 are aligned with corresponding mounting holes on the crankset 1, and held in place by fasteners. This results in stress being placed on the sensor body when a cyclist is pedaling, which is measured by the strain gage 24. The measured stress is then converted to a torque value by means of the bridge circuit 3 and the electronic package 4.

In a first embodiment, the arc-shaped body 21 is made of a metal alloy, such as aluminum or steel. Potentially, other materials can be used, provided that they allow the strain gage 24, bridge circuit 3, and electronic package 4 to function normally. The exact angle between the first finger 22 and the second finger 23 will depend on the number of spider arms 111 in the crankset 1, as the present invention connects one sensor member 2 to each spider arm 111. Thus, assigning the angle between the first finger 22 and the second finger 23 as "A" and the number of spider arms 111 as "N", A=360°/(2*N). For example, if there are five spider arms 111, N=5 and we have A=360°/(2*5)=360°/10=36°. Thus, given five spider arms 111, the angle between the first finger 22 and the second finger 23 of the sensor member 2 is equal to 36°.

In the first embodiment, depending on the alignment of the first finger 22 and the second finger 23 in relation to an arm mounting hole 112 and a chainring mounting hole 122, the present invention can measure tension or compression of the arc-shaped body 21. Thus, at least one tension measuring configuration 61 and at least one compression measuring configuration 62 are provided for the first embodiment.

Figure 3:
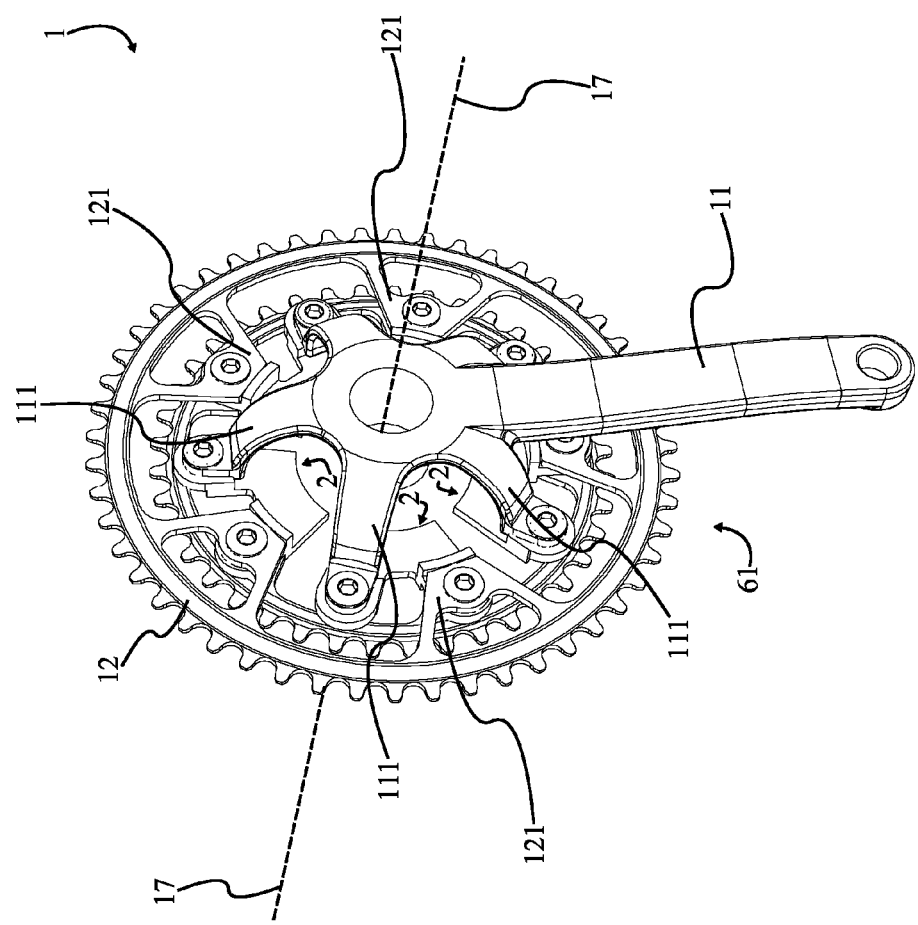
FIG. 3 is a perspective view showing a tension measuring configuration of a first embodiment of the present invention.
Figure 4:
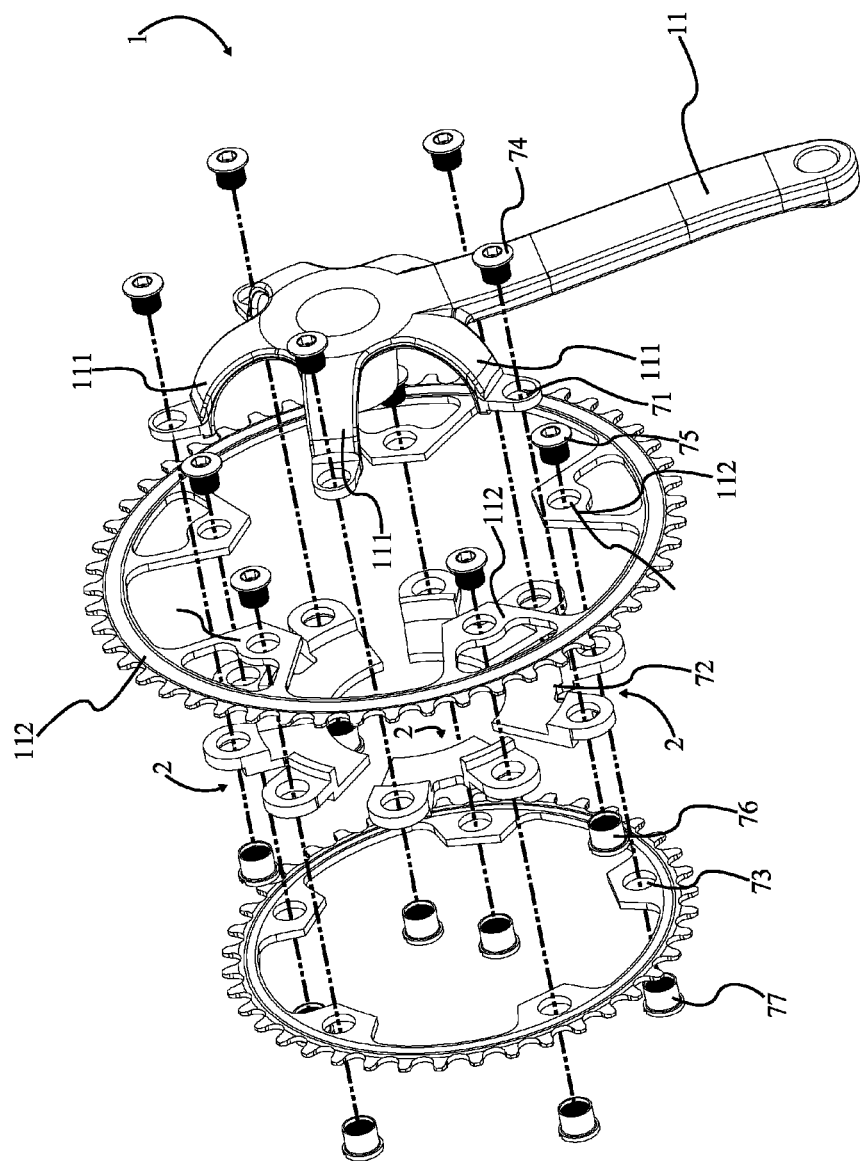
FIG. 4 is an exploded view showing the tension measuring configuration of the first embodiment.
Figure 5:
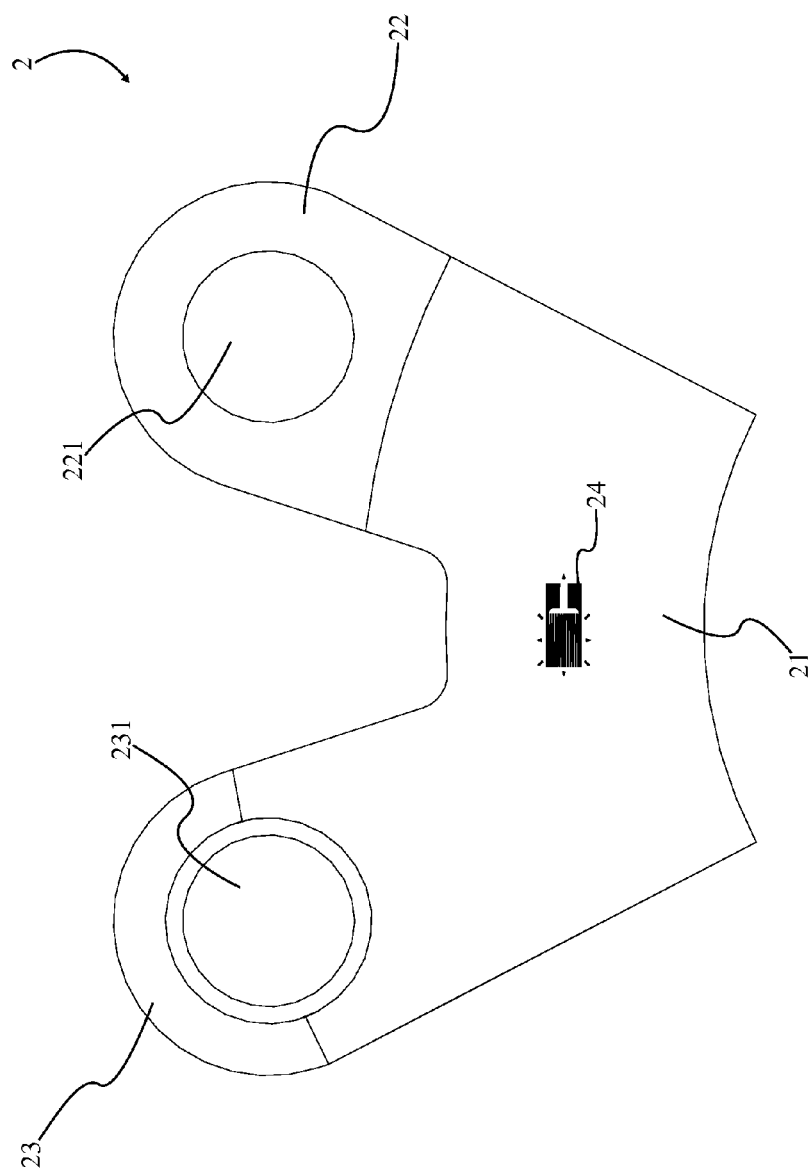
FIG. 5 is a front view showing a sensor member of the tension measuring configuration.
Figure 6:
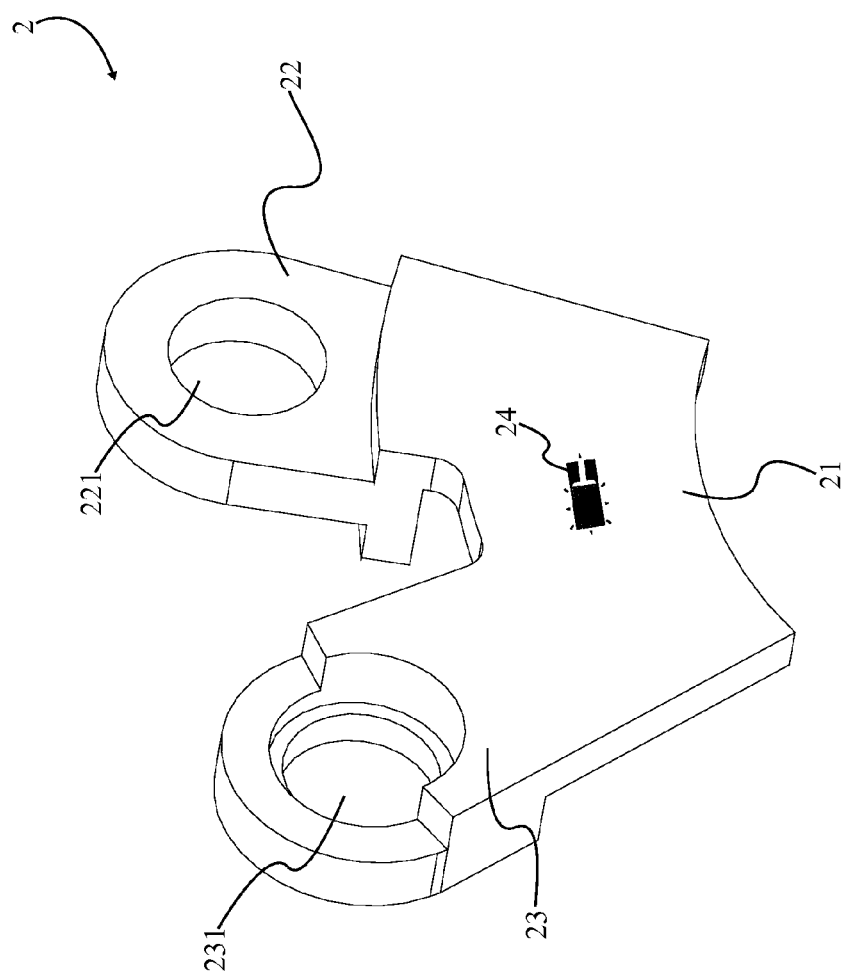
FIG. 6 is a perspective view showing a sensor member of the tension measuring configuration.

Referencing FIG. 3 and FIG. 4, the tension measuring configuration 61 comprises an arbitrary arm 71, a single member 72, a corresponding bracket 73, a first bolt 74, a second bolt 75, a first nut 76, and a second nut 77. The arbitrary arm 71 is selected from the plurality of spider arms 111, the single member 72 is selected from the plurality of sensor members 2, and the corresponding bracket 73 is selected from the plurality of brackets 121. In this configuration, the first finger 22 is positioned flush with the arbitrary arm 71, such that the first finger mounting hole 221 is adjacent to the arm mounting hole 112. Likewise, the second finger 23 is positioned flush with the corresponding bracket 73, such that the second finger mounting hole 231 is adjacent to the chainring mounting hole 122. As a result, the first finger mounting hole 221 is concentrically aligned with the arm mounting hole 112 and the second finger mounting hole 231 is concentrically aligned with the chainring mounting hole 122.

Fastening the arbitrary arm 71, single member 72, and corresponding bracket 73 together are the first bolt 74, second bolt 75, first nut 76, and second nut 77. The first bolt 74 connects the arbitrary arm 71 to the single member 72, sequentially traversing through the arm mounting hole 112 and the first finger mounting hole 221. The first nut 76 engages with the first bolt 74, adjacent to the first finger mounting hole 221 and opposite the arm mounting hole 112. The second bolt 75 and the second nut 77 are parallel to the first bolt 74 and the first nut 76. The second bolt 75 connects the corresponding bracket 73 to the single member 72, sequentially traversing through the chainring mounting hole 122 and the second finger mounting hole 231. The second nut 77 is engaged with the second bolt 75, positioned adjacent to the second finger mounting hole 231 and opposite the chainring mounting hole 122. This configuration results in the sensor member 2 undergoing tension as a cyclist pedals, which is measured by the strain gage 24 and analyzed by the bridge circuit 3 and electronic package 4.

Figure 7:
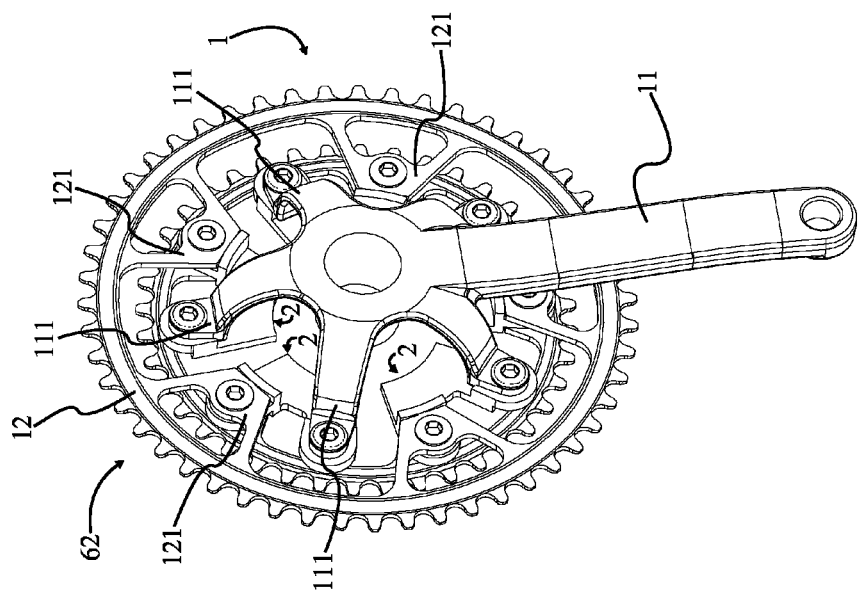
FIG. 7 is perspective view showing a compression measuring configuration of the first embodiment.

Referencing FIG. 7, the compression measuring configuration 62, similar to the tension measuring configuration 61, comprises an arbitrary arm 71, a single member 72, a corresponding bracket 73, a first bolt 74, a second bolt 75, a first nut 76, and a second nut 77. As with the tension measuring configuration 61, the arbitrary arm 71 is selected from the plurality of spider arms 111, the single member 72 is selected from the plurality of sensor members 2, and the corresponding bracket 73 is selected from the plurality of brackets 121. In the compression measuring configuration 62, the first finger 22 is positioned flush with the corresponding bracket 73, such that the first finger mounting hole 221 is adjacent to the chainring mounting hole 122. The second finger 23 is positioned flush with the arbitrary arm 71, such that the second finger mounting hole 231 is adjacent to the arm mounting hole 112. The positioning causes the first finger mounting hole 221 to be concentric with the chainring mounting hole 122 and the second finger mounting hole 231 to be concentric with the arm mounting hole 112.

The first bolt 74, second bolt 75, first nut 76, and second nut 77 once again serve to fasten the arbitrary arm 71, single member 72, and corresponding bracket 73 together. The first bolt 74 connects the corresponding bracket 73 to the single member 72, sequentially traversing through the chainring mounting hole and the first finger mounting hole 221. The first nut 76 engages with the first bolt 74, adjacent to the first finger mounting hole 221 and opposite the chainring mounting hole 122. The arbitrary arm 71 is connected to the single member 72 by the second bolt 75, which sequentially traverses through the arm mounting hole 112 and the second finger mounting hole 231. The second nut 77 engages with the second bolt 75, adjacent to the second finger mounting hole 231 and opposite the arm mounting hole 112. This arrangement of the arbitrary arm 71, single member 72, and corresponding bracket 73 creates compression in the sensor member 2 as a cyclist pedals, with the compression being measured by the strain gage 24 and analyzed by the bridge circuit 3 and electronic package 4.

Figure 8:
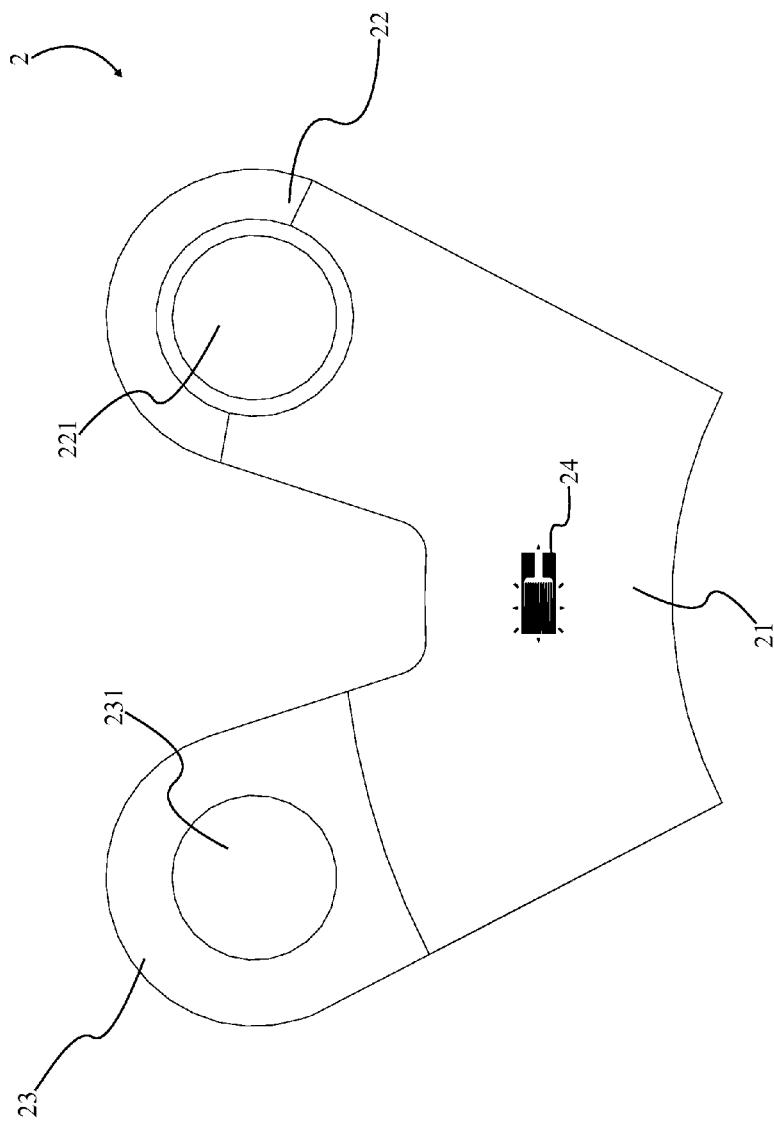
FIG. 8 is a front view showing a sensor member of the compression measuring configuration.

Just as different configurations of the spider arms 111, sensor members 2, and brackets 121 can be used with the present invention, different configurations for the strain gage 24 can be employed. In the most basic strain gage configuration, such as seen in FIG. 8, a single strain gage 24 is tangentially aligned to the arc-shaped body 21. The strain gage 24 is positioned on the arc-shaped body 21 between the first finger 22 and the second finger 23. This provides a single measure of stress, either tension or compression depending on the configuration of the spider arms 111, sensor members 2, and brackets 121.

Figure 9:
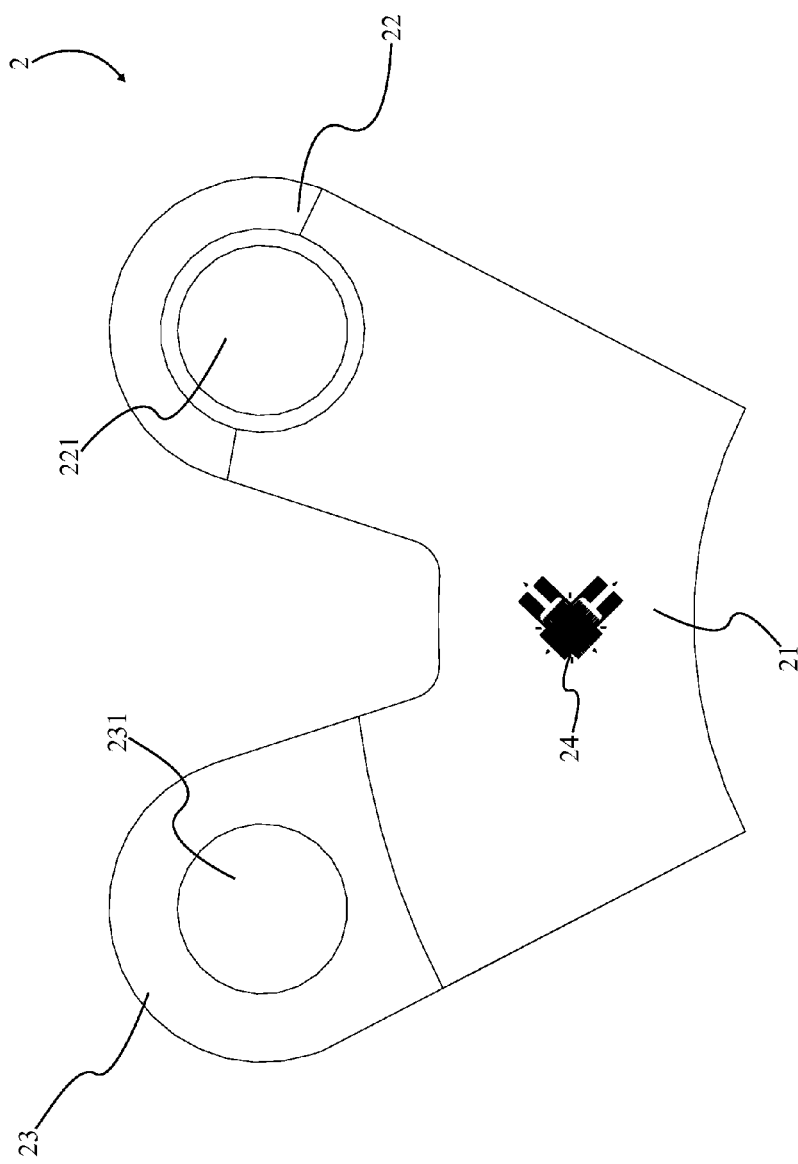
FIG. 9 is a front view showing a biaxial strain gage for the sensor member of the compression measuring configuration.

In a second strain gage configuration, such as seen in FIG. 9, the at least one strain gage 24 comprises a front biaxial strain gage 243 and a rear biaxial strain gage 244. The front biaxial strain gage 243 is positioned on a front face of the arc-shaped body 21 while the rear biaxial strain gage 244 is oppositely positioned on a rear face of the arc-shaped body 21. The front biaxial strain gage 243 and the rear biaxial strain gage 244 each comprises two sub strain gages 24, which are separated by a 90° angle, with a bisecting line being tangential to the arc-shaped body 21. Similar to the basic strain gage configuration, the front biaxial strain gage 243 and rear biaxial strain gage 244 are positioned between the first finger 22 and the second finger 23. This configuration allows the present invention to measure axial strain caused by pedaling torque while eliminating the effect of existing out-of-plane bending and torsional forces which do no work in propelling the bicycle.

Figure 10:
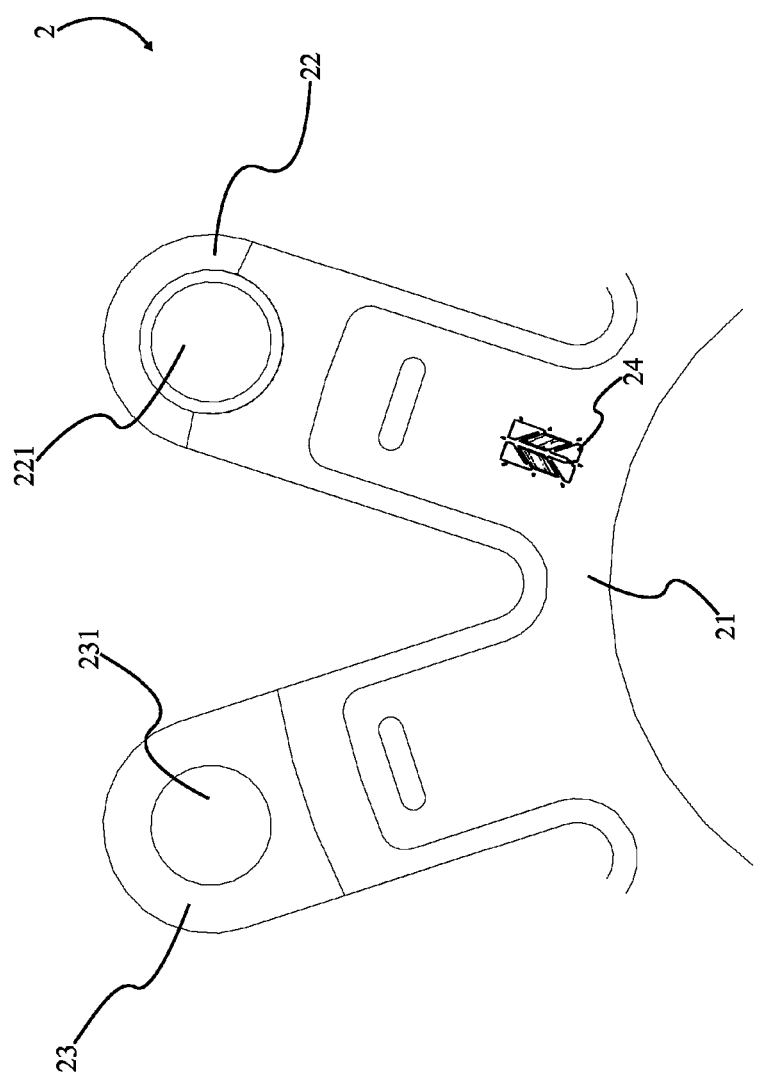
FIG. 10 is a front view showing a shear strain gage for the sensor member of the compression measuring configuration.
Figure 11:
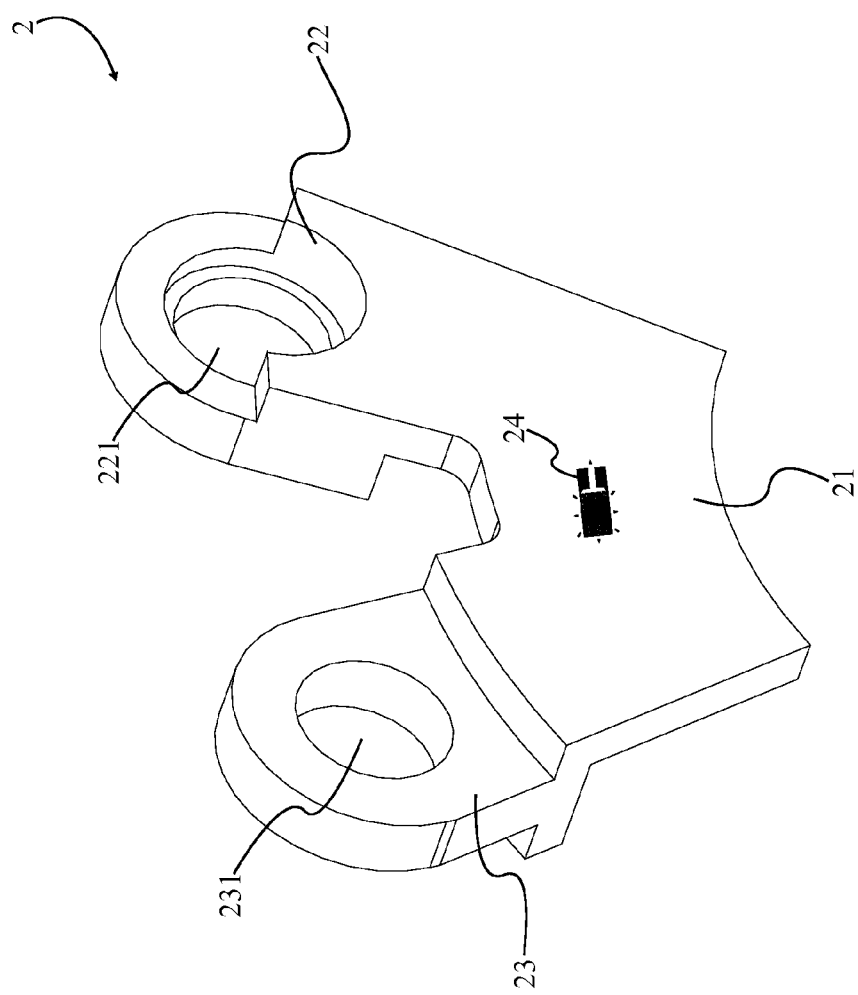
FIG. 11 is a perspective view showing a sensor member of the compression measuring configuration.

In a third strain gage configuration, such as seen in FIG. 10, the at least one strain gage 24 comprises a front shear strain gage 241 and a rear shear strain gage 242. In this configuration, the front strain gage 241 is positioned on a front face of the first finger 22. The rear strain gage 242 is positioned opposite the front strain gage 241, on a rear face of the first finger 22. The front strain gage 241 and the rear strain gage 242 are radially aligned with the arc-shaped body 21, allowing them to measure shearing of the sensor member 2. This configuration allows the present invention to measure shear strain caused by pedaling torque while eliminating the effect of existing out-of-plane bending and torsional forces, which do no work in propelling the bicycle.

Figure 14:
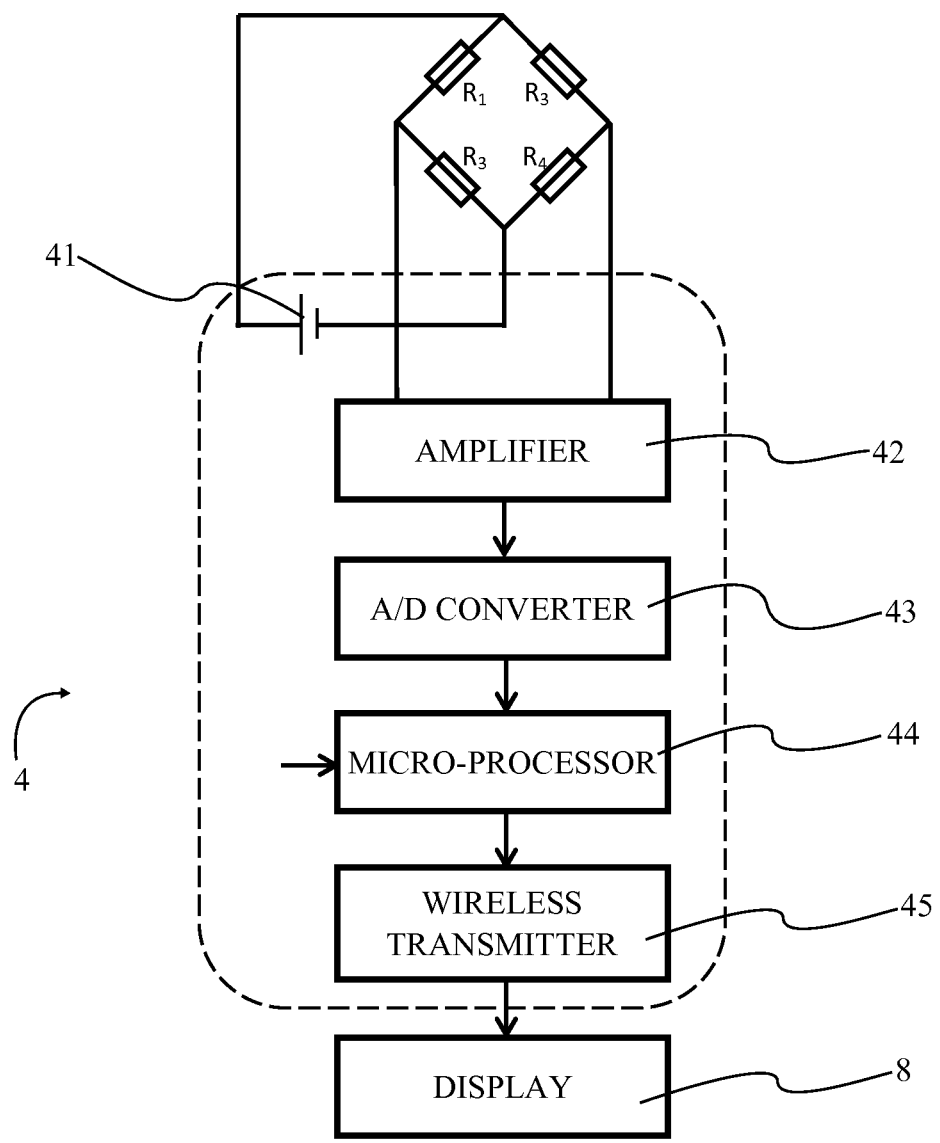
FIG. 14 is a diagram showing a bridge circuit and electronic package of the present invention.
Figure 17:
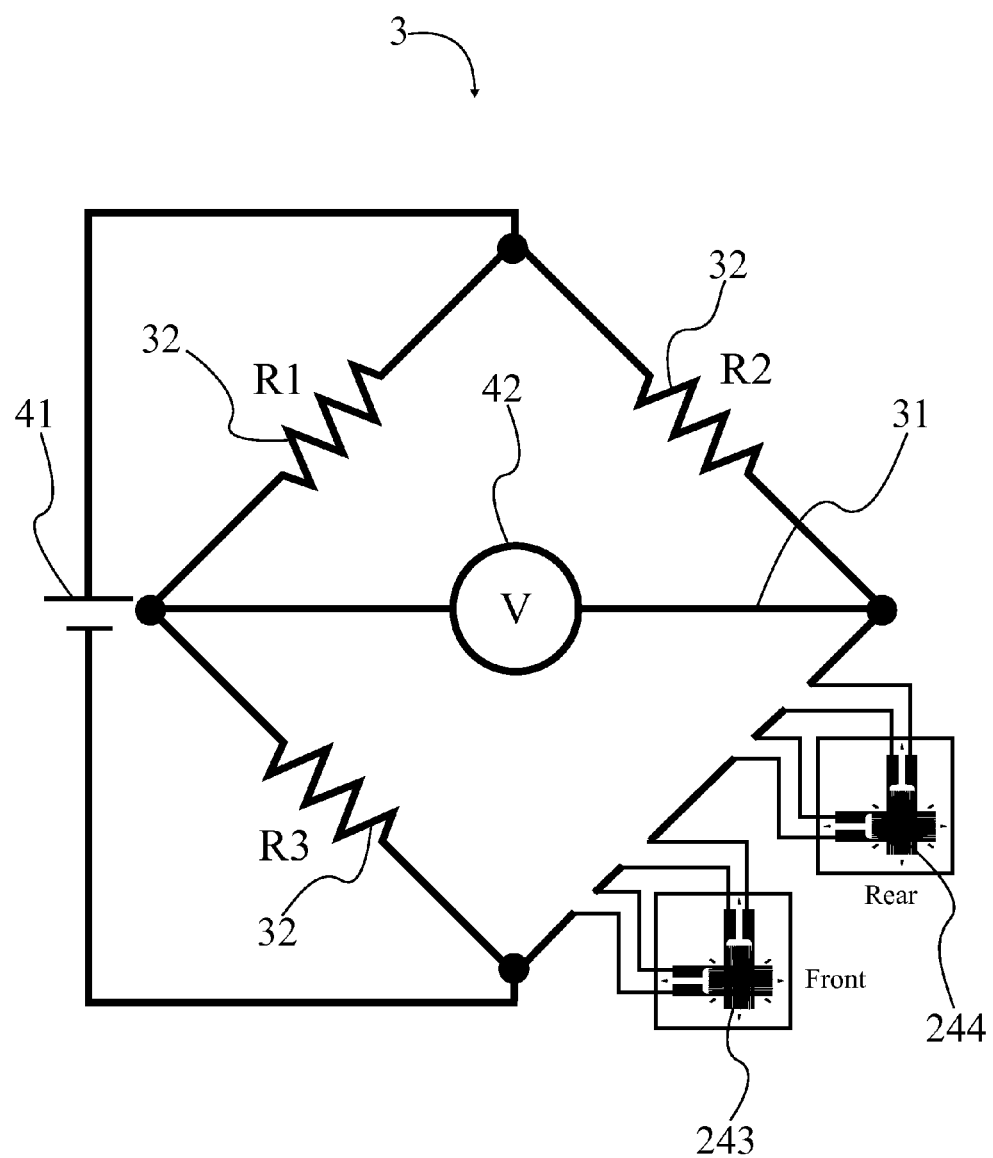
FIG. 17 is a diagram of the Wheatstone bridge for a front and rear biaxial strain gage.
Figure 20:
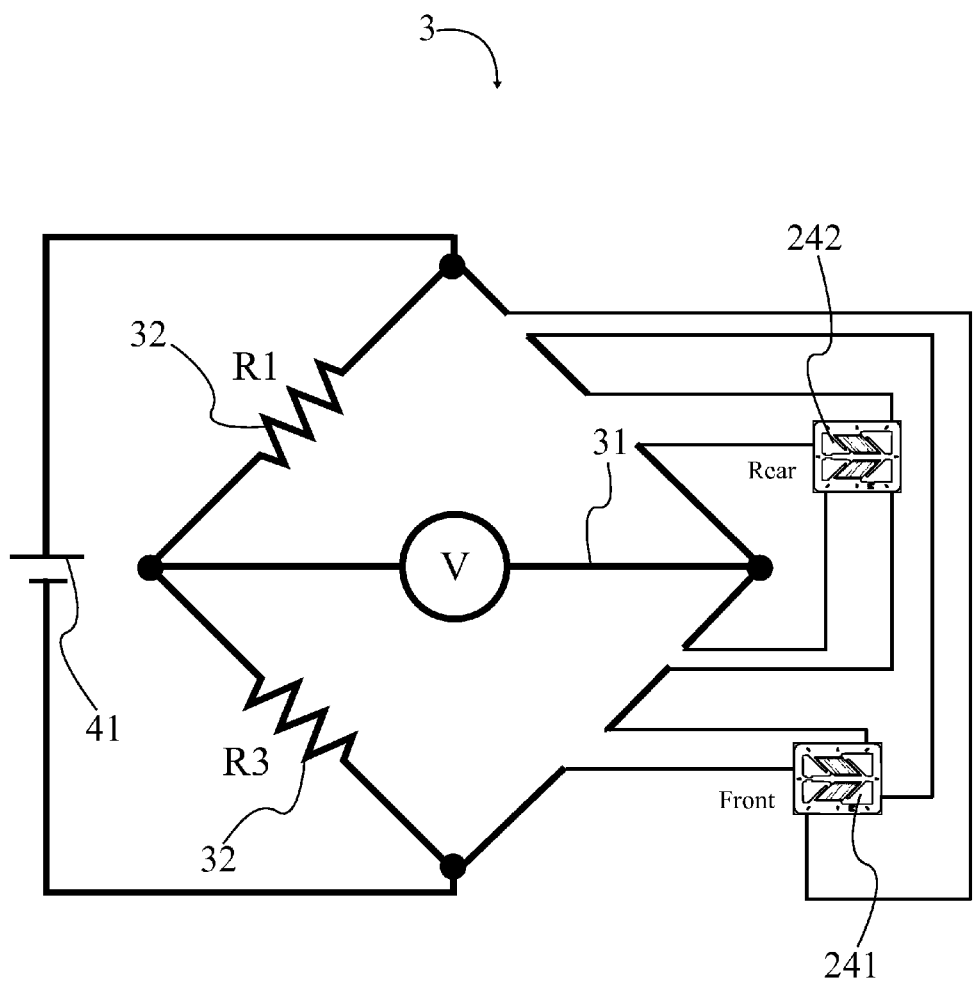
FIG. 20 is a diagram of the Wheatstone bridge for a front and rear shear strain gage.
Figure 21:
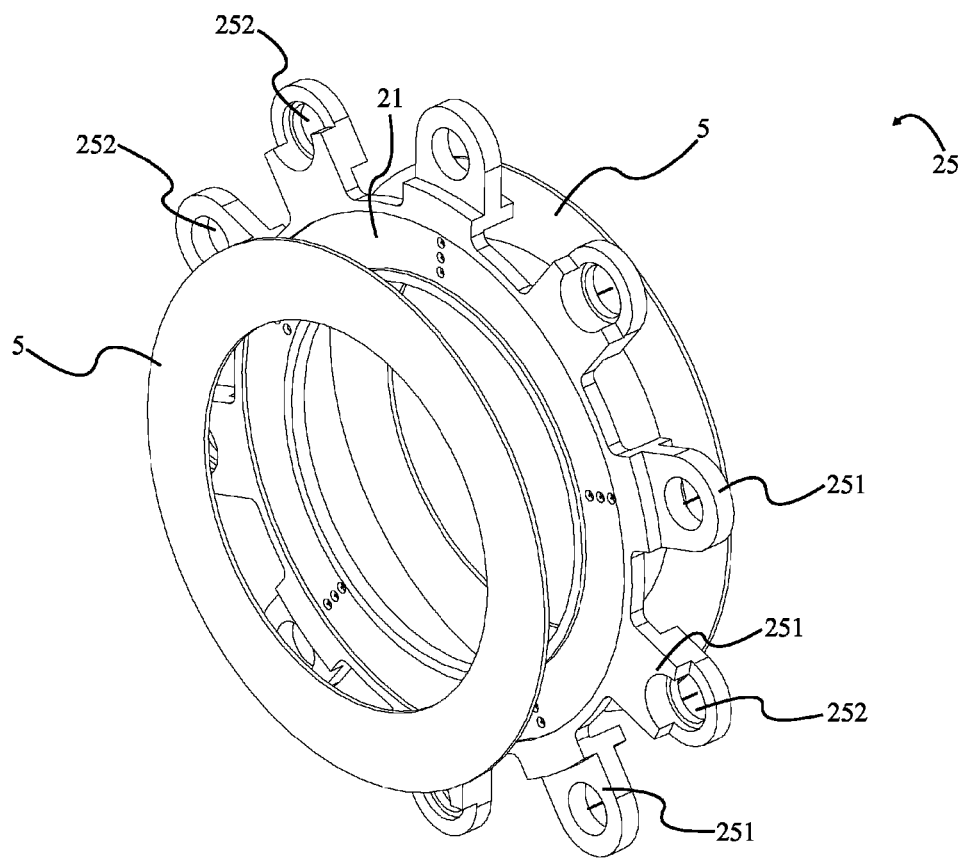
FIG. 21 is a perspective view showing a cover for the second embodiment of the present invention.
Figure 22:
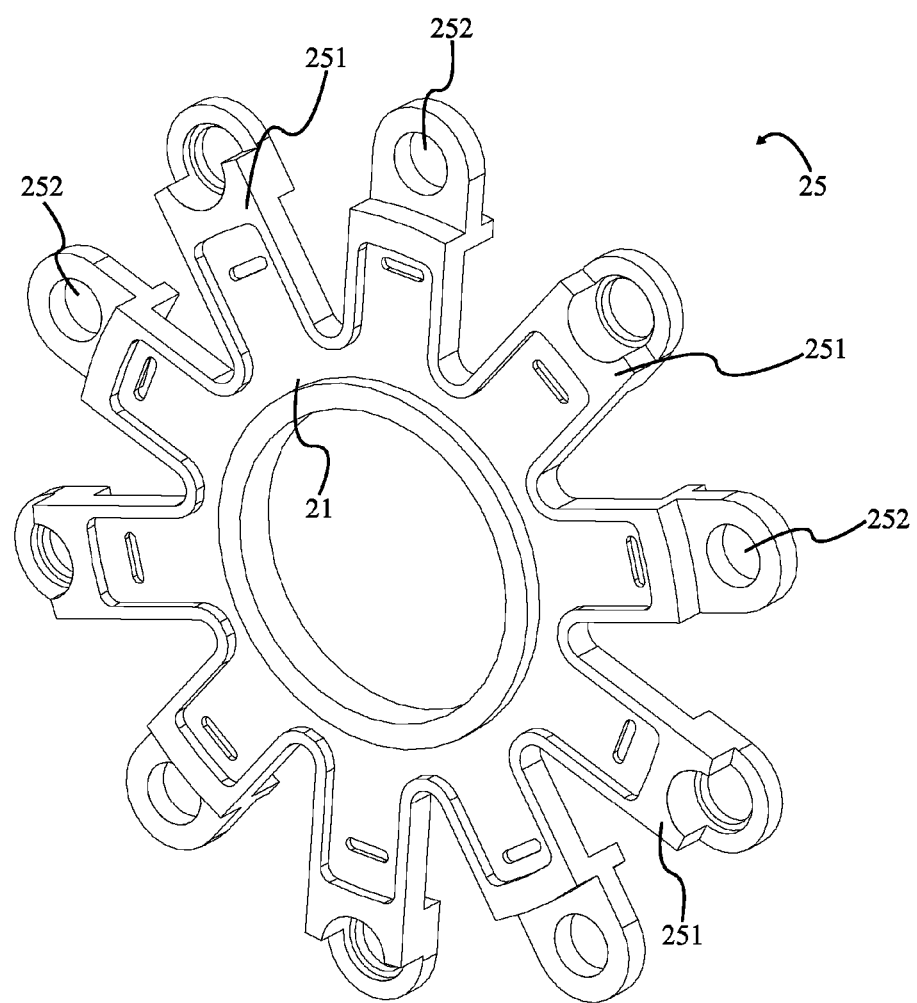
FIG. 22 a perspective view showing a depression on the continuous sensor member of the second embodiment.

Allowing the strain to be analyzed and converted to torque is the bridge circuit 3 and the electronic package 4, diagrams of which are presented in FIG. 14, FIG. 17, and FIG. 20. The electronic package 4, which comprises a battery 41, a strain signal amplifier 42, an analog-to-digital signal converter 43, a microprocessor 44, and a wireless signal transmitter 45, reads analog electric signals from the circuit. In the first embodiment, the circuit 3 is a Wheatstone bridge 31 circuit, which is electrically configured from the strain gage 24 and a plurality of known resistors 32. The Wheatstone bridge 31 is powered by the battery 41, which is electrically connected to the Wheatstone bridge 31. An amplifier 42 is connected across the Wheatstone bridge 31 voltage output terminals. The amplifier 42 is also electrically connected to the analog-to-digital signal converter 43. The analog-to-digital signal converter 43 is electronically connected to the microprocessor 44, which itself is electronically connected to the wireless signal transmitter 45. The electronic package 4 allows strain of the sensor member 2 to be measured and converted to a torque readout, providing a cyclist with feedback about how much pedaling torque they are generating. This information is sent by the wireless signal transmitter 45 to a display 8. The display 8 can be a standalone device, part of a navigation unit, or even a cyclist's smart phone.

In a second embodiment of the present invention, the plurality of sensor members 2 are replaced by a continuous sensor member 25 with equally spaced radial fingers. This continuous sensor member 25 is visible in FIG. 12, FIG. 13, FIG. 16, FIG. 19, FIG. 21, and FIG. 22. In this second embodiment, the continuous sensor member 25 comprises an ring-shaped body 250, a plurality of fingers 251, at least one strain gage 24, and a depression 253. Paralleling the plurality of sensor members 2, the continuous sensor member 25 is radially positioned around the rotation axis 17 of the chainring 12. Each of the plurality of fingers 251 comprises a finger mounting hole 252. The plurality of fingers 251 are radially connected to the ring-shaped body 250. Positioned into the plurality of fingers 251 or the arc-shaped body 21 is the depression 253, which houses the bridge circuit 3 and the at least one strain gage 24. A protective covering 5 seals the depression 253, preventing the bridge circuit 3, and the continuous sensor member 25 from becoming damaged by environmental hazards.

As with the first embodiment, the continuous sensor member 25 of the second embodiment is made of a metal alloy, such as aluminum or steel. Potentially, other materials can be used, provided that they allow the strain gage 24, bridge circuit 3, and electronic package 4 to function normally. The number of fingers 251 in the second embodiment is twice the number of spider arms 111.

For the second embodiment, at least one retrofitted configuration 63 is provided to interconnect the crank arm 11 and chain ring with the continuous sensor member 25. The retrofitting configuration comprises an arbitrary arm 71 from the plurality of spider arms 111, a corresponding bracket 73 from the plurality of brackets 121, an arbitrary finger 78 from the plurality of fingers 251, and an adjacent finger 79 from the plurality of fingers 251. The retrofitted configuration 63 also comprises a first bolt 74, a second bolt 75, a first nut 76, and a second nut 77. The arbitrary finger 78 is positioned flush with the arbitrary arm 71, such that the finger mounting hole 252 of the arbitrary finger 78 is adjacent to the arm mounting hole 112. The adjacent finger 79 is positioned flush with the corresponding bracket 73, such that the finger mounting hole 252 of the arbitrary finger 78 is adjacent to the chainring mounting hole 122. This positioning results in the finger mounting hole 252 of the arbitrary finger 78 being concentric with the arm mounting hole 112, as well as the finger mounting hole 252 of the adjacent finger 79 being concentric with the chainring mounting hole 122.

Securing the arbitrary arm 71 to the arbitrary finger 78 and the corresponding bracket 73 to the adjacent finger 79 are the first bolt 74, first nut 76, second bolt 75, and second nut 77. The first bolt 74 and first nut 76 secure the arbitrary arm 71 to the arbitrary finger 78, with the first bolt 74 sequentially traversing through the arm mounting hole 112 and the finger mounting hole 252 of the arbitrary finger 78. The first nut 76 is engaged to the first bolt 74, positioned adjacent to the finger mounting hole 252 of the arbitrary finger 78 and opposite the arm mounting hole 112. Securing the corresponding bracket 73 to the adjacent finger 79, the second bolt 75 sequentially traverses through the chainring mounting hole 122 and the finger mounting hole 252 of the adjacent finger 79. The second nut 77, positioned adjacent to the finger mounting hole 252 of the adjacent finger 79 and opposite the chain ring mounting hole, is engaged with the second bolt 75. This retrofitting configuration allows the second embodiment to be used to measure both tensile and compressive stress.

The exact angle between the arbitrary finger 78 and the adjacent finger 79 is calculated in the same manner as the first embodiment. Assigning the angle between the arbitrary finger 78 and the adjacent finger 79 as "A", and the number of spider arms 111 as "N", the formula is A=360°/(2*N).

In the second embodiment, the plurality of spider arms 111 and the plurality of brackets 121 are connected to the plurality of fingers 251, such as by the retrofitted configuration 63 described above. To allow the plurality of spider arms 111 and the plurality of brackets 121 to connect to the plurality of fingers 251, the plurality of brackets 121 are radially interspersed between the plurality of spider arms 111. This means that each spider arm 111 from the plurality of spider arms 111 is between two brackets 121, while each bracket from the plurality of brackets 121 is between two spider arms 111.

Figure 12:
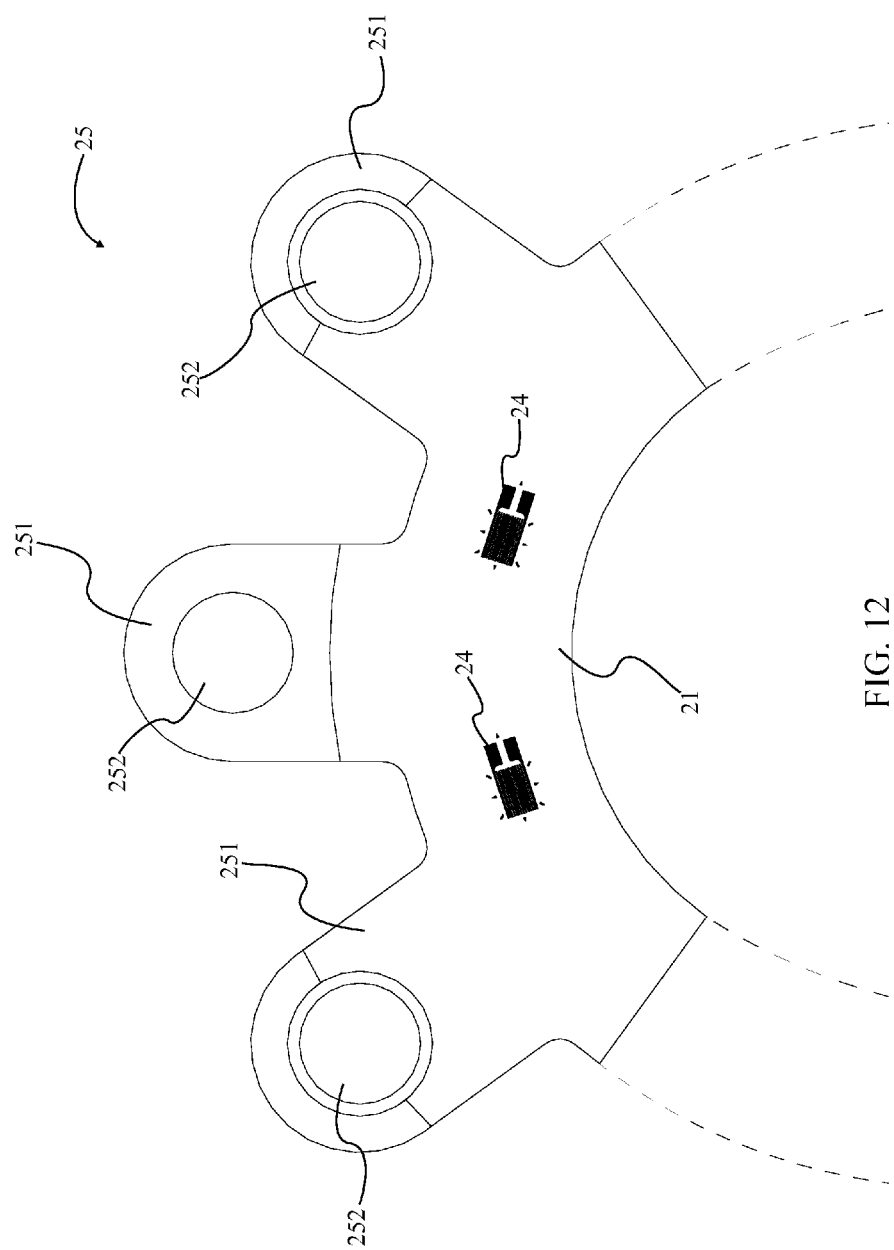
FIG. 12 is front view showing a section of a continuous sensor member of a second embodiment of the present invention.
Figure 13:
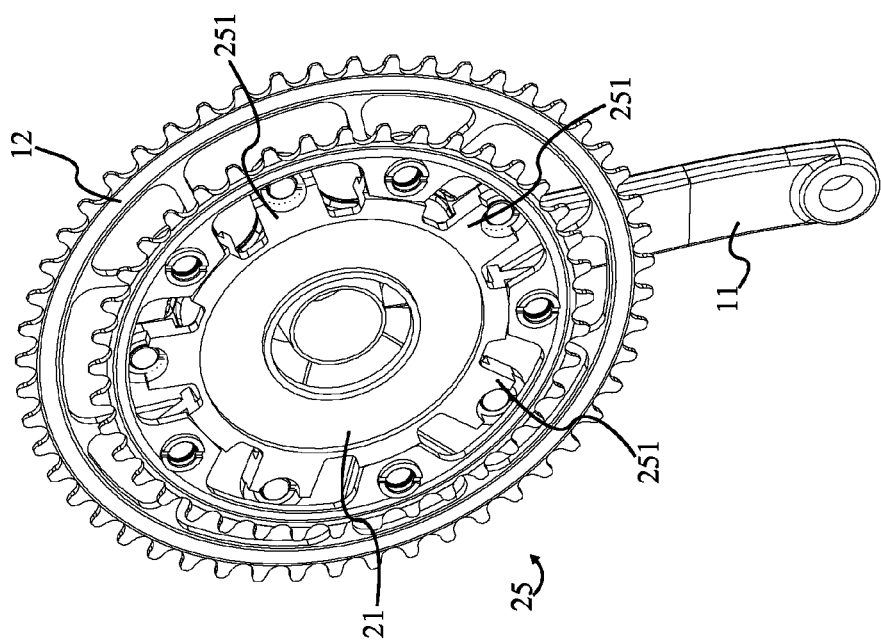
FIG. 13 is a perspective view showing a second embodiment of the present invention.

For the second embodiment, different configurations for the strain gage 24 can be employed. In the most basic strain gage configuration, such as seen in FIG. 12, the at least one strain gage 24 is tangentially aligned to the arc-shaped body 21. The strain gage 24 is positioned on the arc-shaped body 21 between the arbitrary finger 78 and the adjacent finger 79. Since the second embodiment uses a unitary continuous sensor member 25, more than one strain gage 24 can be included to form a first set of strain gages 24 to measure tension and a second set of strain gages 24 to measure compression, with the first set of strain gages 24 and second set of strain gages 24 being alternatively positioned around the arc-shaped body 21. As a result, unlike the first embodiment, this configuration of the second embodiment is capable of measuring both tension and compression.

Figure 15:
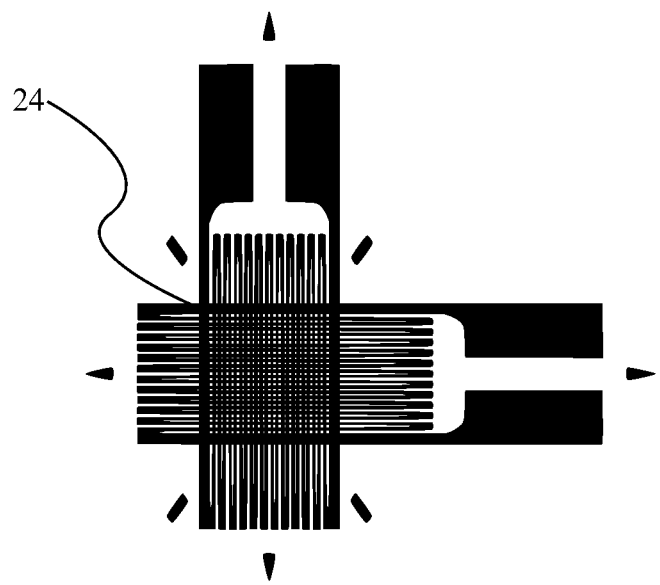
FIG. 15 is a diagram of a biaxial strain gage.
Figure 16:
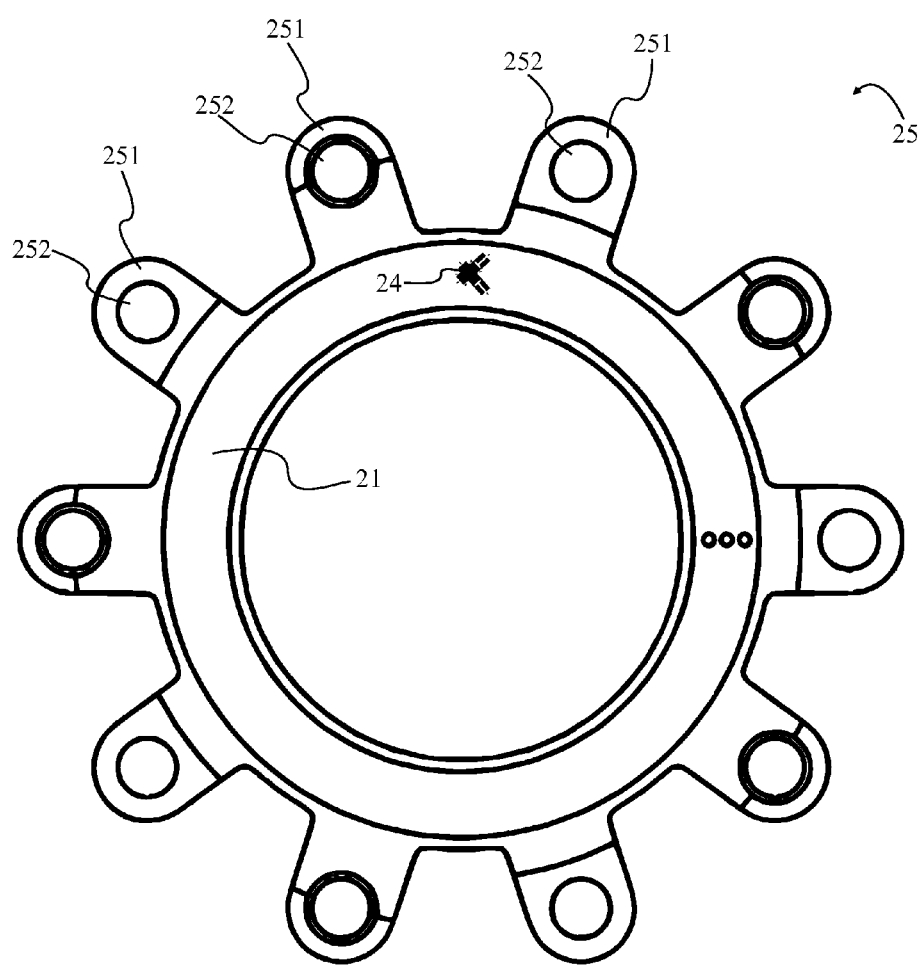
FIG. 16 is a front view of the biaxial strain gage on the continuous sensor member.

In a second strain gage configuration, shown in FIG. 15, FIG. 16, and FIG. 17, the at least one strain gage 24 comprises a front biaxial strain gage 243 and a rear biaxial strain gage 244. Similar to the previous configuration, the front biaxial strain gage 243 is positioned on a front face of the ring-shaped body 250 while the rear biaxial strain gage 244 is oppositely positioned on a rear face of the ring-shaped body 250. The front biaxial strain gage 243 and the rear biaxial strain gage 244 each comprise two sub strain gages 24, which are separated by a 90° angle, with a bisecting line being tangential to the ring-shaped body 250. Similar to the basic strain gage configuration, the front biaxial strain gage 243 and rear biaxial strain gage 244 are positioned between the arbitrary finger 78 and the adjacent finger 79. This configuration allows the present invention to measure axial strain caused by pedaling torque while eliminating the effect of existing out-of-plane bending and torsional forces which do no work in propelling the bicycle. Once again, the unitary nature of the continuous sensor member 25 allows multiple front biaxial strain gages 243 and rear biaxial strain gages 244 to be included with this configuration. A plurality of front biaxial strain gages 243 are thus positioned along the front face of the ring-shaped body 250, while a plurality of rear biaxial strain gages 244 are positioned along the rear face of the ring-shaped body 250.

Figure 18:
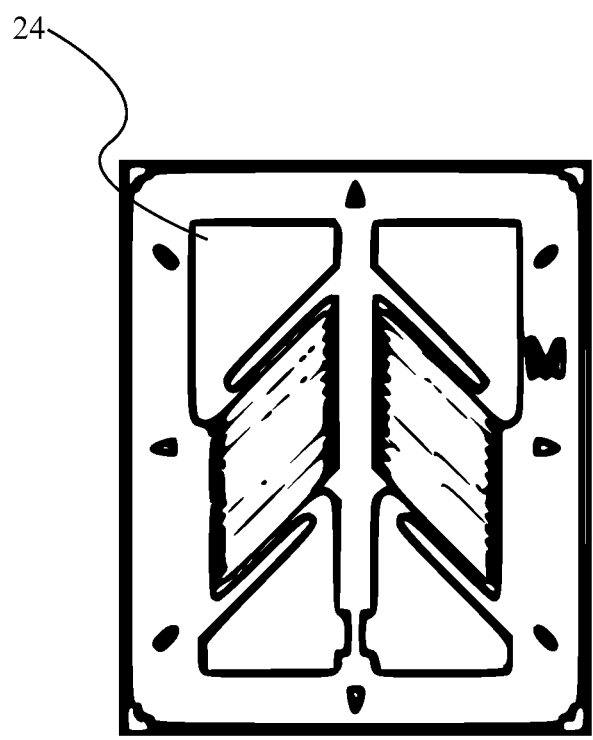
FIG. 18 is a diagram of a shear strain gage.
Figure 19:
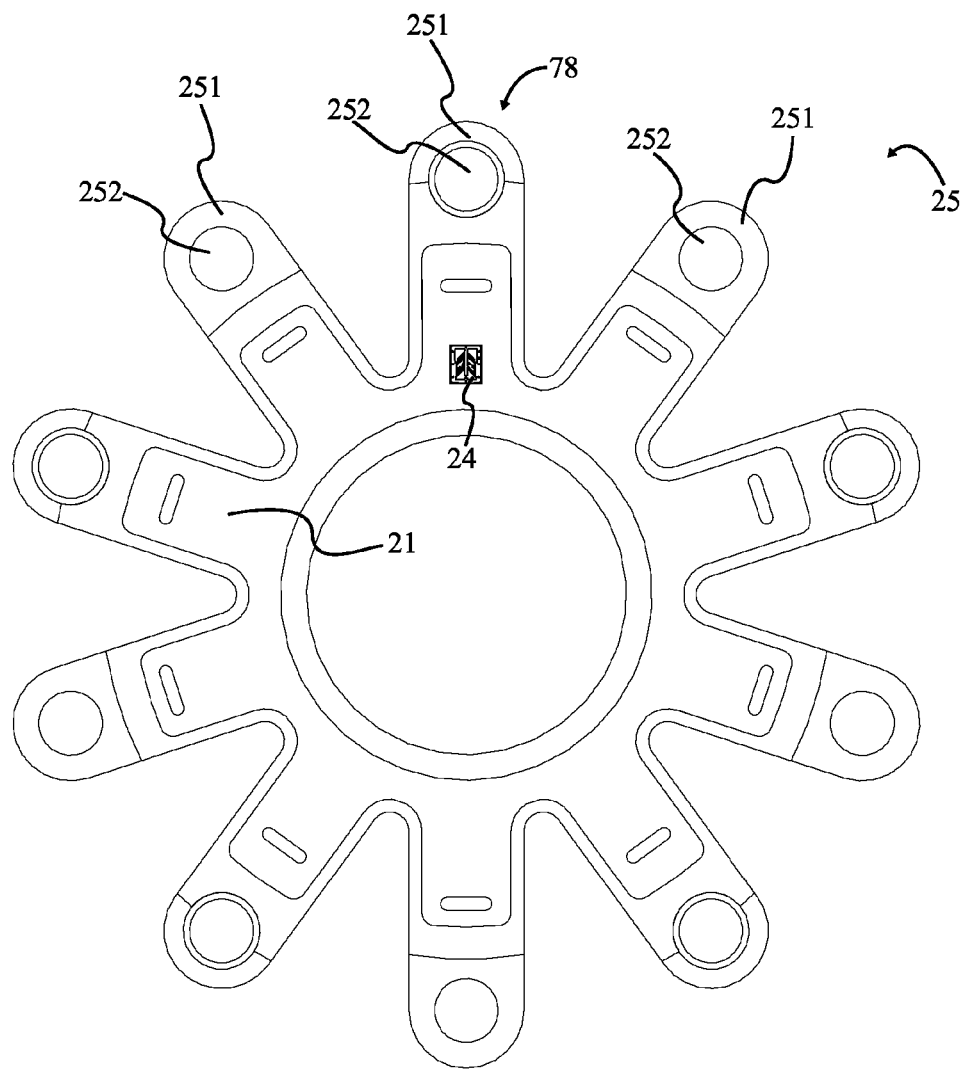
FIG. 19 is a front view of the shear strain gage on the continuous sensor.

As with the first embodiment, in a third strain gage configuration, shown in FIG. 18, FIG. 19, and FIG. 20, the at least one strain gage 24 comprises a front strain gage 241 and a rear strain gage 242. In this configuration, the front strain gage 241 is positioned on a front face of the arbitrary finger 78. The rear strain gage 242 is positioned opposite the front strain gage 241, on a rear face of the arbitrary finger 78. The front strain gage 241 and the rear strain gage 242 are radially aligned with the ring-shaped body 250, allowing them to measure shearing of the continuous sensor member 25. This configuration allows the present invention to measure shear strain caused by pedaling torque while eliminating the effect of existing out-of-plane bending and torsional forces, which do no work in propelling the bicycle. Since the second embodiment utilizes a unitary continuous sensor member 25, more than one front strain gage 241 and more than one rear strain gage 242 can be included to form a plurality of front strain gages 241 and a plurality of rear strain gages 242, each of which are positioned along the plurality of fingers 251.

The bridge circuit 3 and the electronic package 4 of the second embodiment are the same as in the first embodiment. The bridge circuit 3 and the electronic package 4 allowing the strain to be analyzed and converted to torque. The electronic package 4, which comprises a battery 41, a strain signal amplifier 42, an analog-to-digital signal converter 43, a microprocessor 44, and a wireless signal transmitter 45, reads analog electric signals from the bridge circuit 3. In the second embodiment, the bridge circuit 3 is a Wheatstone bridge 31, which is electrically configured from the strain gage 24 and a plurality of known resistors 32. The Wheatstone bridge 31 is powered by the battery 41, which is electrically connected to the Wheatstone bridge 31. An amplifier 42 is connected across the Wheatstone bridge 31 output voltage terminals. The amplifier 42 is also electrically connected to the analog-to-digital signal converter 43. The analog-to-digital signal converter 43 is electronically connected to the microprocessor 44, which itself is electronically connected to the wireless signal transmitter 45. The electronic package 4 allows strain of the sensor member 2 to be measured and converted to a torque readout, providing cyclists with feedback about how much pedaling torque they are generating. This information is sent by the wireless signal transmitter 45 to a display 8. The display 8 can be a standalone device, part of a navigation unit, or even a cyclist's smart phone.

The present invention is used by fitting a plurality of sensor members 2 (or a continuous sensor member 25, in the second embodiment) to a conventional crankset 1, such that the sensor members 2 interconnect the crank arm 11 and the chain ring. When a cyclist applies force to the pedals of a retrofitted crankset 1, the cyclist produces torque on the crank arm 11 that drives (via the connected sensor members 2) the chainrings 12 and the chain. When the battery 41 of the sensor member 2 is turned on, analog signals from the Wheatstone bridge 31 are amplified, digitized, and processed by a microprocessor 44. An outputted digital signal has a value equal to the pedaling torque. Potentially, the signal could be further processed with data such as the crank cadence to calculate the power which is equal to the torque multiplied by the cadence. The outputted digital signal is then wirelessly transmitted to a display 8 (via a receiver), which is mounted on the bicycle. Thus, information related to the pedaling torque or power can be displayed on the receiver or stored in memory.

Although the invention has been explained in relation to its preferred embodiment, it is to be understood that many other possible modifications and variations can be made without departing from the spirit and scope of the invention as hereinafter claimed.

What is claimed is:
1. A system for a pedaling torque measurement device comprises:
   a crankset;
   a plurality of sensor members;
   a bridge circuit;
   an electronic package;
   the crankset comprises a crank arm and a chainring;
   the crank arm comprises a plurality of spider arms;
   the plurality of spider arms being radially positioned around a rotation axis of the chainring
   the chainring comprises a plurality of brackets;
   each of the plurality of spider arms comprises an arm mounting hole;
   each of the plurality of brackets comprises a chainring mounting hole;
   each of the plurality of sensor members being radially positioned around the rotation axis of the chainring;
   each of the plurality of sensor members comprises an arc-shaped body, a first finger, a second finger, and an at least one strain gage;
   the first finger comprises a first finger mounting hole;
   the second finger comprises a second finger mounting hole;

the at least one strain gage being electrically connected to the bridge circuit; and the bridge circuit being electrically connected into the electronic package.

2. The system for a pedaling torque measurement device as claimed in claim 1 comprises:

an at least one tension measuring configuration comprises an arbitrary arm from the plurality of spider arms, a single member from the plurality of sensor members, and a corresponding bracket from the plurality of brackets;

the first finger mounting hole of the single member being positioned adjacent to the arm mounting hole of the arbitrary arm;

the second finger mounting hole of the single member being positioned adjacent to the chainring mounting hole of the corresponding bracket;

the first finger mounting hole of the single member being concentric with the arm mounting hole of the arbitrary arm;

the second finger mounting hole of the single member being concentric with the chainring mounting hole of the corresponding bracket; and wherein the at least one strain gage measures tension of the arc-shaped body.

3. The system for a pedaling torque measurement device as claimed in claim 2 comprises:

the at least one tension measuring configuration further comprises a first bolt, a second bolt, a first nut, and a second nut;

the first bolt sequentially traversing through the arm mounting hole of the arbitrary arm and the first finger mounting hole of the single member;

the first nut being engaged to the first bolt adjacent to the first finger mounting hole of the single member opposite the arm mounting hole of the arbitrary arm;

the second bolt sequentially traversing through the chainring mounting hole of the corresponding bracket and the second finger mounting hole of the single member; and the second nut being engaged to the second bolt adjacent to the second finger mounting hole of the single member opposite the chainring mounting hole of the corresponding bracket.

4. The system for a pedaling torque measurement device as claimed in claim 1 comprises:

an at least one compression measuring configuration comprises an arbitrary arm from the plurality of spider arms, a single member from the plurality of sensor members, and a corresponding bracket from the plurality of brackets;

the first finger mounting hole of the single member being positioned adjacent to the chainring mounting hole of the corresponding bracket;

the second finger mounting hole of the single member being positioned adjacent to the arm mounting hole of the arbitrary arm;

the first finger mounting hole of the single member being concentric with the chainring mounting hole of the corresponding bracket;

the second finger mounting hole of the single member being concentric with the arm mounting hole of the arbitrary arm; and wherein the at least one strain gage measures compression of the arc-shaped body.

5. The system for a pedaling torque measurement device as claimed in claim 4 comprises:

the at least one compression measuring configuration further comprises a first bolt, a second bolt, a first nut, and a second nut;

the first bolt sequentially traversing through the chainring mounting hole of the corresponding bracket and the first finger mounting hole of the single member;

the first nut being engaged to the first bolt adjacent to the first finger mounting hole of the single member opposite the chainring mounting hole of the corresponding bracket;

the second bolt sequentially traversing through the arm mounting hole of the arbitrary arm and the second finger mounting hole of the single member; and the second nut being engaged to the second bolt adjacent to the second finger mounting hole of the single member opposite the arm mounting hole of the arbitrary arm.

6. The system for a pedaling torque measurement device as claimed in claim 1 comprises:

the electronic package comprises a battery, a strain signal amplifier, an analog-to-digital signal converter, a microprocessor, and a wireless signal transmitter;

the bridge circuit being a Wheatstone bridge;

the at least one strain gage and a plurality of known resistors being electrically configured into the Wheatstone bridge;

the amplifier being electrically connected across the Wheatstone bridge;

the amplifier being electrically connected to the analog-to-digital signal converter;

the analog-to-digital signal converter being electronically connected to the microprocessor;

the microprocessor being electronically coupled to the wireless signal transmitter;

the wireless signal transmitter being communicably coupled to a display; and the battery being electrically connected to the Wheatstone bridge.

7. The system for a pedaling torque measurement device as claimed in claim 1 comprises:

the arc-shaped body being radially positioned around the rotation axis of the chainring;

the first finger and the second finger being positioned opposite each other along the arc-shaped body; and the first finger and the second finger being radially connected to the arc-shaped body.

8. The system for a pedaling torque measurement device as claimed in claim 7 comprises:

the at least one strain gage being tangentially aligned with the arc-shaped body; and the at least one strain gage being positioned on the arc-shaped body between the first finger and the second finger.

9. The system for a pedaling torque measurement device as claimed in claim 7 comprises:

the at least one strain gage comprises a front strain gage and a rear strain gage;

the front strain gage being positioned on the first finger;

the rear strain gage being positioned on the first finger opposite the front strain gage; and the front strain gage and the rear strain gage being radially aligned with the arc-shaped body.

10. The system for a pedaling torque measurement device as claimed in claim 7 comprises:

the at least one strain gage comprises a front biaxial strain gage and a rear biaxial strain gage;

the front biaxial strain gage being positioned on the arc-shaped body;

the rear biaxial strain gage being positioned on the arc-shaped body opposite the front biaxial strain gage;

the front biaxial strain gage being positioned between the first finger and the second finger; and the rear biaxial strain gage being positioned between the first finger and the second finger.

11. A system for a pedaling torque measurement device comprises:

a crankset;

a continuous sensor member;

a bridge circuit;

an electronic package;

a protective covering;

the continuous sensor member being attached to the crankset;

the crankset comprises a crank arm and a chainring;

the crank arm comprises a plurality of spider arms;

the plurality of spider arms being radially positioned around a rotation axis of the chainring;

the chainring comprises a plurality of brackets;

each of the plurality of spider arms comprises an arm mounting hole;

each of the plurality of brackets comprises a chainring mounting hole;

the continuous sensor member being radially positioned around the rotation axis of the chainring;

the continuous sensor member being concentrically aligned with the chain ring and the plurality of spider arms;

the continuous sensor member comprises a ring-shaped body, a plurality of fingers, at least one strain gage, and a depression;

each of the plurality of fingers comprises a finger mounting hole;

the at least one strain gage being electrically connected into the bridge circuit;

the bridge circuit being electrically connected to the electronic package;

the bridge circuit, the at least one strain gage, and the electronic package being housed within the depression; and the protective covering overlaying the depression, wherein the protective covering prevents the bridge circuit, the at least one strain gage, and the electronic package from becoming wet and dirtied.

12. The system for a pedaling torque measurement device as claimed in claim 11 comprises:

an at least one retrofitted configuration comprises an arbitrary arm from the plurality of spider arms, a corresponding bracket from the plurality of brackets, an arbitrary finger from the plurality of fingers, and an adjacent finger from the plurality of fingers;

the arbitrary finger and the adjacent finger being positioned opposite each other along the ring-shaped body;

the arbitrary finger and the adjacent finger being radially connected to the ring-shaped body;

the finger mounting hole of the arbitrary finger being positioned adjacent to the arm mounting hole of the arbitrary arm;

the finger mounting hole of the adjacent finger being positioned adjacent to the chainring mounting hole of the corresponding bracket;

the finger mounting hole of the arbitrary finger being concentric with the arm mounting hole of the arbitrary arm; and the finger mounting hole of the adjacent finger being concentric with the chainring mounting hole of the corresponding bracket.

13. The system for a pedaling torque measurement device as claimed in claim 12 comprises:

the at least one retrofitted configuration further comprises a first bolt, a second bolt, a first nut, and a second nut;

the first bolt sequentially traversing through the arm mounting hole of the arbitrary arm and the finger mounting hole of the arbitrary finger;

the first nut being engaged to the first bolt adjacent to the finger mounting hole of the arbitrary finger opposite the arm mounting hole of the arbitrary arm;

the second bolt sequentially traversing through the chainring mounting hole of the corresponding bracket and the finger mounting hole of the adjacent finger; and the second nut being engaged to the second bolt adjacent to the finger mounting hole of the adjacent finger opposite the chainring mounting hole of the corresponding bracket.

14. The system for a pedaling torque measurement device as claimed in claim 11 comprises:

the plurality of brackets being radially interspersed between the plurality of spider arms;

both the plurality of spider arms and the plurality of brackets being connected to the plurality of fingers; and the depression being positioned into the continuous sensor member.

15. The system for a pedaling torque measurement device as claimed in claim 11 comprises:

the electronic package comprises a battery, a strain signal amplifier, an analog-to-digital signal converter, a microprocessor, and a wireless signal transmitter;

the bridge circuit being a Wheatstone bridge;

the at least one strain gage and a plurality of known resistors being electrically configured into the Wheatstone bridge;

the amplifier being electrically connected across the Wheatstone bridge;

the amplifier being electrically connected to the analog-to-digital signal converter;

the analog-to-digital signal converter being electronically connected to the microprocessor;

the microprocessor being electronically coupled to the wireless signal transmitter;

the wireless signal transmitter being communicably coupled to a display; and the battery being electrically connected to the Wheatstone bridge.

16. The system for a pedaling torque measurement device as claimed in claim 12 comprises:

the at least one strain gage being tangentially aligned with the ring-shaped body; and the at least one strain gage being positioned on the ring-shaped body between the arbitrary finger and the adjacent finger.

17. The system for a pedaling torque measurement device as claimed in claim 12 comprises:

the at least one strain gage comprises a front strain gage and a rear strain gage;

the front strain gage being positioned on the arbitrary finger;

the rear strain gage being positioned on the arbitrary finger opposite the front strain gage; and the front strain gage and the rear strain gage being radially aligned with the ring-shaped body.

18. The system for a pedaling torque measurement device as claimed in claim 12 comprises:
- the at least one strain gage comprises a front biaxial strain gage and a rear biaxial strain gage;
- the front biaxial strain gage being positioned on the ring-shaped body;
- the rear biaxial strain gage being positioned on the ring-shaped body opposite the front biaxial strain gage;
- the front biaxial strain gage being positioned between the arbitrary finger and the adjacent finger; and
- the rear biaxial strain gage being positioned between the arbitrary finger and the adjacent finger.

\* \* \* \* \*